Feb. 3, 1959 F. C. LEMKE 2,871,751
SELF-TAPPING SCREW HAVING LARGE CHIP CAVITY
Filed June 28, 1956
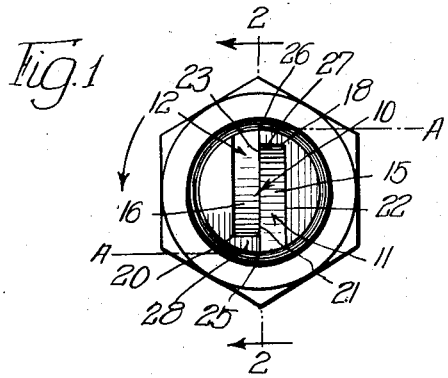
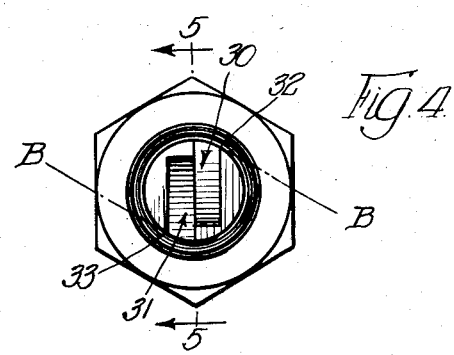
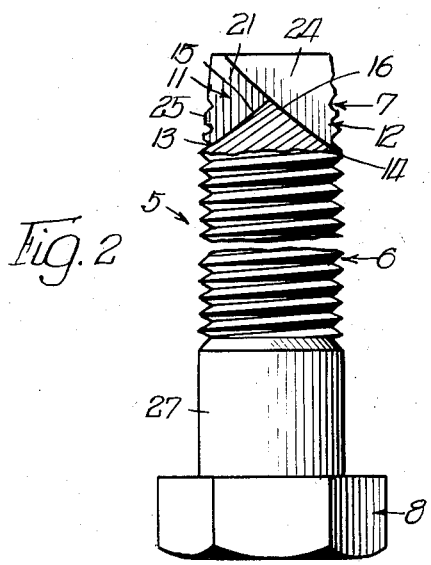
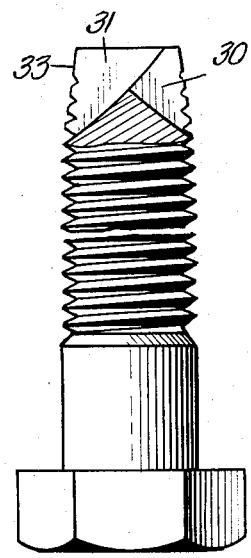
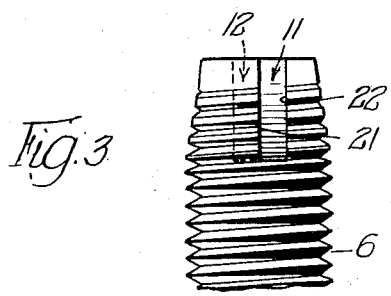
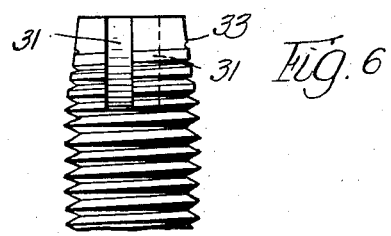
INVENTOR.
Frank C. Lemke,
BY
Cromwell, Greist & Warden
attys

United States Patent Office 2,871,751
Patented Feb. 3, 1959

2,871,751

SELF-TAPPING SCREW HAVING LARGE CHIP CAVITY

Frank C. Lemke, River Grove, Ill., assignor to Pheoll Manufacturing Company, Chicago, Ill., a corporation of Illinois Application June 28, 1956, Serial No. 594,418

3 Claims. (Cl. 85—47)

This invention relates, generally, to improvements and innovations in self-tapping screws. More particularly, the invention relates to the provision of self-tapping screws characterized by the features of requiring less driving torque than other self-tapping screws that are available and by giving a high percent of thread contact which is nearly equal to that obtained with pre-tapped holes and far above that obtained using commercially available self-tapping screws.

A number of self-tapping or self-threading screws have been disclosed and patented such, for example, as those disclosed in U. S. Patents Nos. 1,909,476 to Trotter, 2,572,647 to Merwin and 2,624,228 to Brown. In general there are two factors which militate against the use of self-tapping of self-threading screws as compared with the use of standard screws in pre-tapped holes. One of the factors is the increased torque required to drive the self-tapping screws and the second factor is the substantial reduction in percentage of thread contact. Nevertheless, a very substantial number of self-tapping screws are employed industrially in order to reduce production costs by eliminating a separate tapping or threading operation wherever possible.

The object of this invention, generally stated, is the provision of self-tapping or self-threading screws which are economical to manufacture and which are substantially improved with respect to both of the factors of: (1) minimum torque required for driving; and (2) maximum thread contact.

A more specific object of the invention is the provision of a self-tapping screw having a large chip cavity in the entering or leaving end thereof with full access from both sides, while leaving a large amount of material or stock in a critical location so as not to weaken or impair the cutting action of the cutting edges.

Another object of the invention is the provision of a self-tapping screw with a large chip cavity in the entering or leaving end thereof and in which the design is such that the cutting edges may be alternately formed so that in one case the cutting edge is substantially normal or tangent to a slot in the side of the screw whereas in a second form the cutting edge forms an acute angle with the side of a slot in the screw.

Certain other objects of the invention will, in part, be obvious and will, in part, appear hereinafter.

For a more complete understanding of the nature and scope of the invention, reference may now be had to the following detailed description thereof taken in connection with the accompanying drawings wherein:

Fig. 1 is a top plan view of a self-tapping screw constituting one embodiment of the invention;

Fig. 2 is a side elevational view partly in section on line 2—2 of Fig. 1;

Fig. 3 is a side elevational view taken at right angles to line 2—2 in Fig. 1;

Fig. 4 is a top end or plan view of a self-tapping screw forming a second embodiment of the invention;

Fig. 5 is a side elevational view partly in section on line 5—5 of Fig. 4; and

Fig. 6 is a side elevational view taken at right angles to line 5—5.

Referring first to the embodiment shown and illustrated in Figs. 1–3, the self-tapping screw is indicated generally at 5 and comprises a threaded shank 6, a tapered entering or tip portion 7 and a head 8. The head 8 shown is a conventional hex head but it will be understood that any type of heads may be used including slotted heads, recessed heads, and heads with various special driving recesses.

As a matter of convenience and simplicity, the term "screws" is used in the specification and claims to cover fasteners of the type referred to therein although some of these could very well be classified as bolts, or either as bolts or screws. The invention is equally applicable to both forms as well as to the form of fastener referred to as a stud wherein there is a shank that is threaded on both ends with one end adapted to be turned into a piece of work while the other end projects as a bolt therefrom.

The tip portion 7 has a chip cavity formed in the end thereof which is designated at 10 having an entrance opening at the upper end of the tip as viewed in Fig. 2 substantially rectangular in shape. This chip cavity is formed by cutting two juxtaposed slots in the tip portion from opposite sides thereof, one of the slots being indicated at 11 and the other at 12. These slots 11 and 12 are substantially rectangular in horizontal cross section and are generally triangular in vertical cross section. Since sides of the slots in vertical cross section may be slightly curved or straight depending on the method or tool used for cutting, the expression "generally triangular" is used to designate slots having straight or arcuate sides.

The apex of slot 11 is designated at 13 (Fig. 2) and is located at or adjacent to the exterior thereof. Likewise, the apex 14 for slot 12 is similarly positioned. Usually the apexes 13 and 14 will be located approximately at the place where the tip portion 14 merges with the full diameter portion of the shank 6. However, the apexes 13 and 14 may be positioned above and below such level in certain embodiments.

The inner leg of the triangular slot 11 is indicated at 15 while the inner leg of slot 12 is indicated at 16. If the slots are formed by a cutter wheel, these legs 15 and 16 will be arcuate, depending upon the particular set-up which is used. However, these slots could be cut so that these legs 15 and 16 would be straight.

The bases of the two slots 11 and 12 are generally rectangular and may be considered as combined to form the rectangular opening or entry 10 into the chip cavity. It will be seen in this connection that the outer end of each of the inner legs 15 and 16 terminates at one of the corners of the rectangular opening as indicated at 18 and 20, respectively. The corners 18 and 20 are diagonally positioned. The other pair of diagonal corners each opens into one of the slots 11 or 12 as shown in Fig. 1.

The slots 11 and 12 are so formed and positioned that their inner side walls intersect and lie in a common plane which longitudinally bisects the screw 5 along line 2—2 of Fig. 1. In Fig. 2 the exposed portion of the inner side wall for slot 11 is designated at 21. The outer side wall for slot 11 does not appear in Fig. 2 but is indicated in Figs. 1 and 3 at 22. The inner side wall for slot 12 does not appear in Fig. 2 but is indicated in Fig. 1 at 23. The outer side wall of slot 12 is shown in Fig. 2 and designated at 24. The slots 11 and 12 may be considered to intersect in a scissors-like manner.

Normally the self-tapping screws will be provided with right-hand threads so that in driving the screw 5 will be turned in a counterclockwise direction as viewed in Fig. 1. The direction of rotation is indicated by the arrow adjacent that figure. It will be appreciated that the threads could be left-handed, in which event the screw would be driven in a clockwise direction as viewed in Fig. 1. Since the screw is driven in a counterclockwise direction as viewed in Fig. 1, the cutting edges of the entering or tip portion 7 will be the edges of the slots 11 and 12 which lie in the plane through line 2—2 longitudinally bisecting the screw. The cutting edge for slot 11 is indicated at 25 while that for slot 12 is indicated at 26. Cutting edge 25 is shown in Fig. 2. It will be seen that the threads on the exterior of the shank portion 27 extend partway down the tip portion 7 but the crowns of the threads are progressively cut off so that the depth of the threads is decreased progressively approaching the upper end of the tip portion as viewed in Fig. 2.

As indicated by the normal or tangent lines A—A in Fig. 1, the cutting edges 25 and 26 intersect the plane on line 22 at right angles or tangentially. In other words, the cutting edges 25 and 26 are on dead center. It will also be seen that the cutting edges 25 and 26 are backed up with a substantial amount of the material forming the screw body as indicated at 27 and 28, respectively. It has been found that this particular embodiment or form is especially suitable for use in connection with cast iron, aluminum and other metals and materials which have a tendency to chip.

In Figs. 4–6 an embodiment of the invention is shown which corresponds generally to the embodiment shown in Figs. 1–3 except that the relationship of the slots is reversed as can be seen by comparing Figs. 1 and 4. To avoid repetition this embodiment will not be described in detail except to point out the differences between the first embodiment shown in Figs. 1–3 and the second embodiment shown in Figs. 4–6. The thread in Figs. 4–6 is also right-handed so that it is driven counterclockwise as viewed in Fig. 4. It will be seen that this embodiment has a chip cavity in the end of the tip which has a rectangular opening at the entrance where the bases of the two slots 30–31 lie side-by-side. However, in this embodiment the cutting edges of the tip portion are indicated at 32 and 33, respectively, and it will be seen that neither of them is located on the dead center but rather on a cord of a cross section through the tip portion. The tangents to the cutting edges 32 and 33 are indicated at B—B. The tangents B—B form acute angles with the adjacent sides of the slots 30 and 31. It has been found that this particular embodiment is particularly adapted for use in holes in non-chippable materials, such as steel and plastics where a sharp cutting edge is required.

It will be apparent that the same machines and substantially the same set-ups may be used in producing either of the two embodiments shown in Figs. 1–3 or 4–6.

The self-tapping screws produced in accordance with this invention have been compared with standard screws which are used in pre-tapped holes and also with other types of self-tapping screws, particularly the type wherein one slot is cut clear through the entering or tip end of the screw. With respect to the factor of thread contact, it is known that a standard screw in a pre-tapped hole will give approximately 75% thread contact. The self-tapping screws of the present invention when driven into a smooth untapped hole will afford approximately 70% thread contact while a self-tapping screw having a single slot extending all the way through the tip end will afford only about 50% thread contact.

With respect to driving torque, the torque required to drive a standard screw into a pre-tapped hole is, of course, much lower than required to drive a self-tapping screw. Therefore, the only comparison made was between the self-tapping screws of the present invention and the self-tapping screw formed by extending the slot all the way through the tip end. With respect to this comparison, the self-tapping screws of the present invention could be driven with substantially less torque than the self-tapping screws having the single slot even though 70% thread contact was obtained on the one hand whereas only 40% was obtained on the other.

It will be understood that minor changes may be made in the foregoing embodiments of the invention without departing from the spirit and scope of the invention.

What is claimed as new is:

1. A self-tapping screw comprising a threaded shank portion and a thread cutting tapered tip portion on the lower end when the screw is head up in a vertical position and in which the threads run out, a chip cavity in the bottom end of said tip portion having a generally rectangular entrance opening occupying the center and a large portion of the bottom end of said tip portion and formed by the combined bases of two juxtaposed slots of substantial width entering said tip portion from opposite sides thereof with the lower ends of each slot extending inwardly well past the center of said bottom end so as to terminate adjacent the side opposite entry, said slots being substantially rectangular in horizontal cross section and generally triangular in vertical cross section and formed by cutters entering said tapered tip portion from opposite sides, the apex of each slot being located adjacent the exterior of said screw on opposite sides thereof and approximately at the upper end of said tip portion, the lower end of the inner inclined leg and wall of each slot terminating at one corner of a pair of diagonally positioned corners of said rectangular opening, each corner of the other pair of diagonal corners opening into the adjacent one of said slots, each of said triangular slots having parallel inner and outer vertical side walls spaced apart a distance defining the width of each slot, said inner vertical side walls lying in a common vertical plane which longitudinally bisects said shank and tip portions, said inner inclined leg and wall of each slot extending at angles of approximately 45 degrees to the longitudinal axis of said shank portion.

2. The self-tapping screw called for in claim 1 wherein the direction of the threads and relative position of said slots are such that the cutting edges of said slots lie in said common plane.

3. The self-tapping screw called for in claim 1 wherein the direction of the threads and relative position of said slots are such that the cutting edges of said slots lie in different parallel planes each plane of which includes the outer side wall of one of said slots.

References Cited in the file of this patent
UNITED STATES PATENTS

| | | |
|---|---|---|
| 1,909,476 | Trotter | May 16, 1933 |
| 2,507,882 | Berman | May 16, 1950 |